(12) United States Patent
Bass et al.

(10) Patent No.: US 7,225,462 B2
(45) Date of Patent: May 29, 2007

(54) SYSTEMS AND METHODS FOR MANAGING WEB USER INFORMATION

(75) Inventors: Michael S. Bass, Lawrenceville, GA (US); Mark A. Kirpatrick, Conyers, GA (US); Andre D. Jarboe, Acworth, GA (US); Darin Morrow, Acworth, GA (US); Steven Thobe, Roswell, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 856 days.

(21) Appl. No.: 10/179,280

(22) Filed: Jun. 26, 2002

(65) Prior Publication Data

US 2005/0022006 A1    Jan. 27, 2005

(51) Int. Cl.
*G06F 17/30* (2006.01)

(52) U.S. Cl. ................ 726/6; 726/4; 726/5; 726/7; 726/8

(58) Field of Classification Search ............. 713/155, 713/168, 182; 726/2–8; 709/223, 229, 217–219, 709/224–226, 230; 715/744; 707/1–3, 9, 707/10, 102
See application file for complete search history.

(56) References Cited

U.S. PATENT DOCUMENTS

| | | | |
|---|---|---|---|
| 6,138,238 A | 10/2000 | Scheifler et al. | |
| 6,178,511 B1 | 1/2001 | Cohen et al. | |
| 6,189,000 B1 | 2/2001 | Gwertzman et al. | |
| 6,205,480 B1 | 3/2001 | Broadhurst et al. | |
| 6,209,036 B1 | 3/2001 | Aldred et al. | |
| 6,219,790 B1 | 4/2001 | Lloyd et al. | |
| 6,226,752 B1 | 5/2001 | Gupta et al. | |
| 6,243,816 B1 | 6/2001 | Fang et al. | |
| 6,269,373 B1 | 7/2001 | Apte et al. | |
| 6,275,825 B1 * | 8/2001 | Kobayashi et al. | 707/9 |
| 6,282,652 B1 | 8/2001 | Scheifler | |
| 6,510,466 B1 * | 1/2003 | Cox et al. | 709/229 |
| 6,606,643 B1 * | 8/2003 | Emens et al. | 709/203 |
| 6,763,468 B2 * | 7/2004 | Gupta et al. | 726/2 |
| 6,826,696 B1 * | 11/2004 | Chawla et al. | 726/4 |
| 6,957,390 B2 * | 10/2005 | Tamir et al. | 715/744 |
| 7,099,915 B1 * | 8/2006 | Tenereillo et al. | 709/203 |
| 2002/0112155 A1 * | 8/2002 | Martherus et al. | 713/155 |
| 2002/0120761 A1 * | 8/2002 | Berg | 709/230 |
| 2003/0069874 A1 * | 4/2003 | Hertzog et al. | 707/1 |

OTHER PUBLICATIONS

Netegrity SiteMinder® 4.6 Apr. 2001.
Netegrity SiteMinder® 5.5 Oct. 2002.

* cited by examiner

*Primary Examiner*—Hosuk Song
*Assistant Examiner*—Nirav Patel
(74) *Attorney, Agent, or Firm*—Scott P. Zimmerman; Geoff Sutcliffe; Todd Mitchem (57) ABSTRACT

Embodiments of the present invention relate to systems and methods for managing information concerning users of a network web site. The system includes a web server for providing access to various network resources, such as web pages and applications and an applications server coupled to the web server for running two or more protected applications, to which access is restricted to authorized users. The system also includes a customer profile and registration application for receiving user login information and authenticating users and providing single sign-on capability. The system further includes a user directory server for centrally managing information concerning users, a first database for storing user credentials and a second database for storing user profile information. User profile information and user credentials can be added, modified, deleted or retrieved by operations carried out within at least one of said applications.

20 Claims, 4 Drawing Sheets

SYSTEMS AND METHODS FOR MANAGING WEB USER INFORMATION

BACKGROUND OF THE INVENTION

1. Field of the Invention

Embodiments of the present invention relate to information management systems. More particularly, embodiments of the present invention relate to systems and methods for managing information concerning users of a network web site.

2. Background Information

Corporate web sites often provide access to multiple applications, and typically require separate user authentication in order to access each of these applications. The requirement for user authentication provides data security for sensitive information, such as customer-specific information, which can be accessed through an application. User authentication typically requires storage and management of user information. Most web sites currently use separate security for each web application. It is not unusual to require users to be authenticated at each major application within the same corporate web site.

Providing for user authentication at the application level, rather than at the web site level, places a burden not only on users, but also on web site and application administrators. Each application must provide for and maintain its own authentication mechanism and/or database(s) of user information. If enhancements or modifications to the user authentication or data storage techniques are developed, they must be coded, tested and installed in each application.

In view of the foregoing, it can be appreciated that a substantial need exists for systems and methods that can advantageously provide for centralized management of user information and single user authentication for accessing multiple applications within a network web site.

BRIEF SUMMARY OF THE INVENTION

Embodiments of the present invention relate to systems and methods for managing information concerning users of a network web site. According to a preferred embodiment, a system of the present invention includes a web server for providing access to various network resources, including web pages and applications, and an applications server coupled to the web server for running two or more protected applications, to which access is restricted to authorized users. The preferred system of the invention further includes a customer profile and registration application operating in conjunction with the web server and applications server for receiving user login information and authenticating users, wherein said customer profile and registration provides single sign-on capability, such that a user can access two or more restricted applications via a single login. The preferred system of the invention also includes a user directory server for centrally managing information concerning users, said user directory server being coupled to (i) a first database for storing user credentials for a plurality of users, and (ii) a second database for storing user profile information for a plurality of users, wherein said user profile information and said user credentials can be added, modified, deleted or retrieved by operations carried out within at least one of said applications.

According to a preferred embodiment, the method of the invention includes establishing a communications link between a network web site and a user computer, the network web site including: (i) a web server for providing access to various network resources, including web pages and applications; (ii) an applications server coupled to the web server for running two or more protected applications, to which access is restricted to authorized users; and (iii) a user directory server for centrally managing information concerning users. The preferred method of the invention further includes storing user credentials for a plurality of users in a first database coupled to the user directory server and storing user profile information for a plurality of users in a second database coupled to the user directory server. The preferred method of the invention further includes receiving a user request for access to a protected application, and receiving user login information and authenticating a user by comparing the user login information with user credentials stored in the first database. The preferred method of the invention also includes enabling an authenticated user to access two or more protected applications without requiring further authentication, and retrieving user profile information from the second database for use in connection with operations carried out by the user within one or more applications.

DETAILED DESCRIPTION OF THE INVENTION

Figure 1:
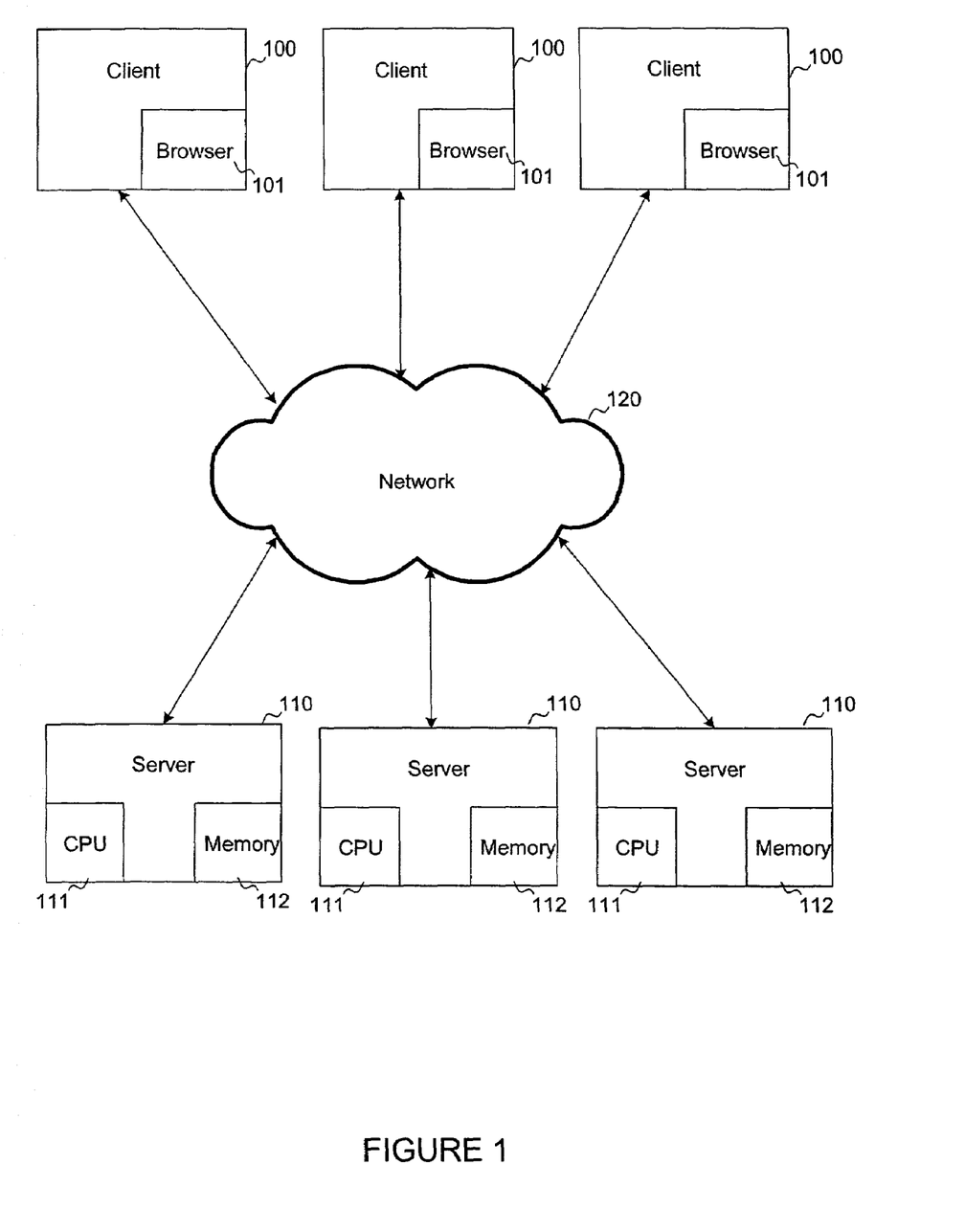
FIG. 1 is schematic illustration of a network architecture in accordance with an embodiment of the present invention.

An embodiment of the present invention is implemented with client-server architecture within a network. For example, as shown in FIG. 1, a plurality of client computers 100 (i.e., clients) communicates with a plurality of server computers 110 via network 120. Server 110 includes a processor 111 and a memory 112. Processor 111 can be, for example, an Intel Pentium® 4 processor, manufactured by Intel Corp. of Santa Clara, Calif. As another example, processor 111 can be an Application Specific Integrated Circuit (ASIC). Server 110 can be, for example, a UNIX server from Sun Microsystems, Inc. of Palo Alto, Calif. Memory 112 may be a random access memory (RAM), a dynamic RAM (DRAM), a static RAM (SRAM), a volatile memory, a non-volatile memory, a flash RAM, polymer ferroelectric RAM, Ovonics Unified Memory, magnetic RAM, a cache memory, a hard disk drive, a magnetic storage device, an optical storage device, a magneto-optical storage device, or a combination thereof. Memory 112 of server 110 can store a plurality of instructions configured to be executed by processor 111.

In FIG. 1, client 100 is coupled to server 110 via network 120 and a network connection (e.g., data port, input/output port, etc.). As used herein, the term network includes a Wide Area Network (WAN), a Local Area Network (LAN), an intranet, the Internet, a wireless network, a wired network, a connection-oriented network, a packet network, an Internet Protocol (IP) network, or a combination thereof. For example, client 100 may be coupled to a local network, which is in turn linked to a local server computer or to equipment operated by an Internet Service Provider (ISP). The ISP provides communication via the world wide packet data communication network known as the "Internet." Client 100 may include browser application 101, which provides a user interface for allowing the user to access resources in the network, e.g., to navigate the Internet. Examples of browser 101 include Internet Explorer from Microsoft Corporation of Redmond, Wash. and Netscape Navigator from Netscape Communications of Mountain View, Calif.

As used to describe embodiments of the present invention, the terms "coupled" and "linked" encompass a direct connection, an indirect connection, or a combination thereof. Two devices that are coupled or linked can engage in direct communications, in indirect communications, or a combination thereof. Moreover, two devices that are coupled or linked need not be in continuous communication, but can be in communication typically, periodically, intermittently, sporadically, occasionally, and so on. Further, the term "communication" is not limited to direct communication, but also includes indirect communication.

Embodiments of the present invention can be implemented within one or more networks for supporting data communications via one or more communications channels. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

According to an embodiment of the present invention, there is provided a system and method for managing information concerning users of a network web site. The term "network web site" includes a web site which is accessible via a network such as the Internet and/or the world wide web (WWW), but also includes a server that provides access to various resources, such as data and applications, within other types of networks, such as an intranet.

Figure 2:
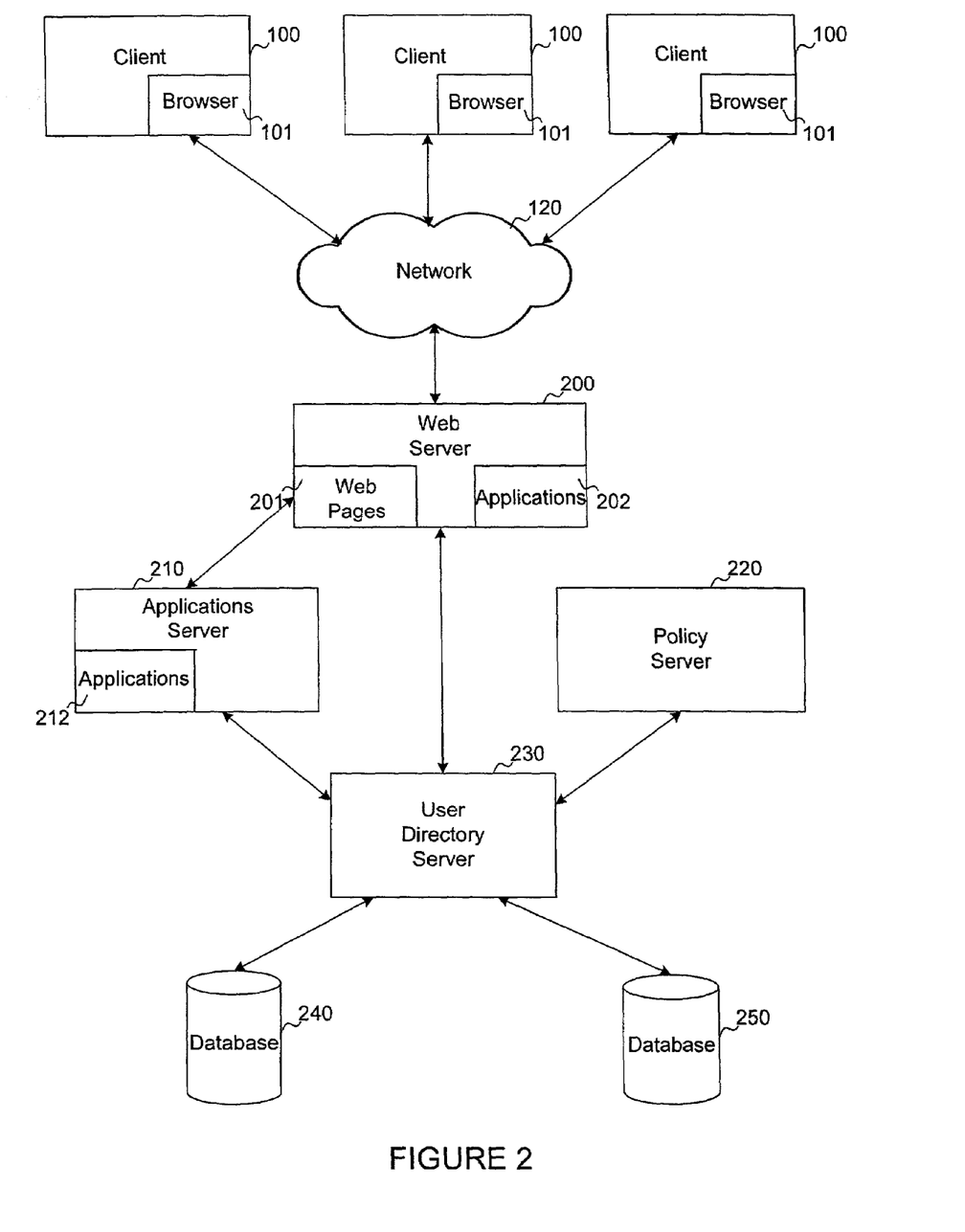
FIG. 2 is a schematic illustration of a system in accordance with an embodiment of the present invention.

FIG. 2 is a schematic diagram of an embodiment of the system of the present invention. As shown in FIG. 2, a plurality of client computers 100, which may include a browser application 101, communicate via network 120 with one or more web servers 200. Web server 200 acts as a gateway to provide the user access to various resources, including static HTML web pages 201 and web applications 202 that can run on the same machine as the web server 200. Web server 200 also provides a link to one or more applications servers 210, which can run on different machines than the web server, and which provide access to various applications 212.

As shown in FIG. 2, in accordance with an embodiment of the invention, there is provided a user directory server 230 coupled to at least one web server 200, at least one applications server 210, and at least one policy server 220. The user directory server 230 is also coupled to one or more databases, 240, 250, for storing information concerning users of the network web site. User directory server 230 is an application server that manages user information in one or more central data stores, such as databases 240, 250. User directory server 230 is preferably implemented as a Java™ Remote Method Invocation (RMI) server. RMI is provided as part of the Java™ software development kit available from Sun Microsystems of Mountain View, Calif. The RMI server implementation allows any type of Java™ application to access the user directory server 230, including Java™ servlets, Enterprise Java™ Beans (EJB), Java™ CORBA servers, and other RMI servers. Alternatively, user directory server 230 has a CORBA interface, so that it is accessible by non-Java™ applications, as well. The CORBA interface serves as a translator or wrapper layer, enabling the user directory server to communicate and interact with non-Java™ applications, such as C++ applications.

The term "servlet" refers to a software module that resides on a Java™-enabled web server. An EJB is a non-visual, remote object designed to run on a server and be invoked by clients. An EJB can be built from multiple, non-visual Java™ beans. Java™ beans are objects with an external interface, called the properties interface, which allow a tool to read what the component is, what it is supposed to do, hook it up to other beans, and plug it into another environment. Java™ beans are intended to be local to a single process and are often visible at runtime. The visible component can be, for example, a button, list box, graphic or chart. EJBs, on the other hand, are intended to live on one machine and be invoked from another machine, and EJBs have a deployment descriptor that is intended as a description about the bean that can be read by a tool. EJBs are also platform independent and can be used on any platform that supports Java™ programming language.

CORBA refers to Common Object Request Broker Architecture, which is a protocol designed by the Object Management Group consortium for providing interoperability among hardware and software products. CORBA is an Object Request Broker (ORB)—the middleware that establishes the client-server relationships between objects. Using an ORB, a client can transparently invoke a method on a server object, which can be on the same machine or across a network. The ORB intercepts the call and is responsible for finding an object that can implement the request, pass it the parameters, invoke its method and return the results. The client does not have to be aware of where the object is located, its programming language, its operating system, or any other system aspects that are not part of an object's interface. In doing so, the ORB provides interoperability between applications running on different machines in heterogeneous distributed environments and seamlessly interconnects multiple object systems. CORBA is an integration technology that allows applications to communicate with one another no matter where they are located, who has designed them, or in which programming language they are written. RMI is an ORB, which has been built into the Java™ programming language.

Figure 3:
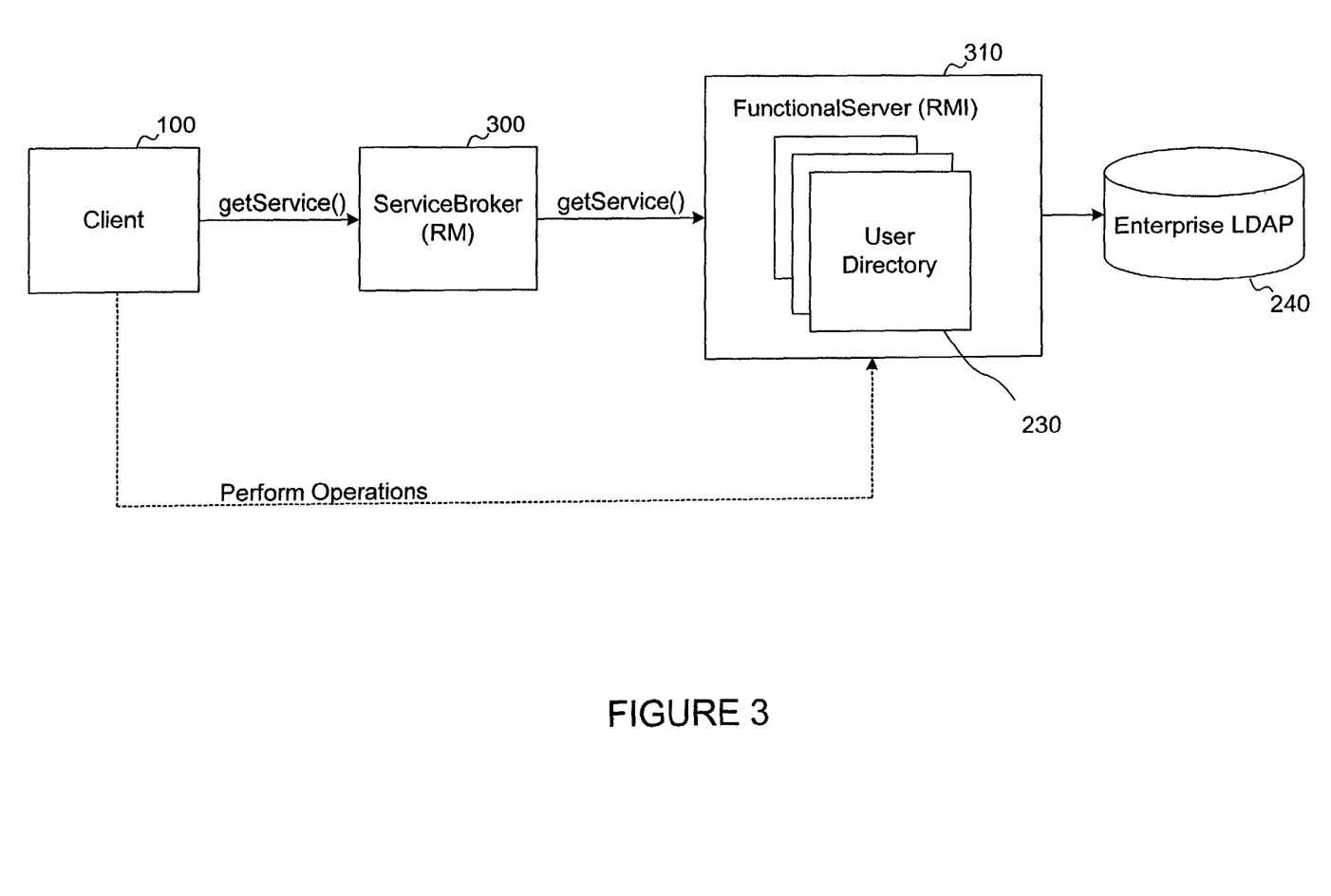
FIG. 3 illustrates a preferred embodiment of the user directory server architecture in accordance with an embodiment of the present invention.

FIG. 3 illustrates an embodiment of a user directory server architecture in accordance with the invention. As illustrated in FIG. 3, in a preferred embodiment, user directory server 230 is implemented as an RMI server 310 on a ServiceBroker 300 framework. ServiceBroker is a framework for hosting RMI servers and for adding production-oriented services to the barebones RMI runtime. The framework takes the form of an RMI server 310 that provides directory services, load distribution, and manageability to other RMI servers. The manageability features include status and performance monitoring, tuneability, and standardized configuration. In accordance with a preferred embodiment, client 100 connects to ServiceBroker 300 and requests a reference to the user directory server 230. ServiceBroker 300 contacts the appropriate FunctionalServer 310 based on the service name requested (in this case, the user directory service). The FunctionalServer 310 returns an instance of the user directory server. A pool of user directory server instances is maintained by the FunctionalServer 310. The FunctionalServer 310 allocates instances from the pool in round robin fashion. The number of user directory instances is configurable. The reference returned by the FunctionalServer 310 is returned to client 100 by ServiceBroker 300. Once the client has a reference to a user directory server instance, Service Broker 300 is no longer involved in the communications between the client and server. Clients hang onto the reference to a particular user directory server instance for as long as desired. They can make multiple calls against the same server. Multiple clients may have a reference to the same user directory server instance, and hence the user directory server is thread safe. The user directory server can be a stateless server, such that no session state is maintained by the user directory server.

In a preferred embodiment, the system of the invention includes at least two databases 240 and 250, which are coupled to user directory server 230. (See FIGS. 2 and 3.) In a preferred embodiment, at least a first database 240 is implemented as a Lightweight Directory Access Protocol (LDAP) directory. The second database 250 can be a different type of storage mechanism, such as an Oracle™ database, an SQL database, a relational database, and so on. First database 240 stores user credentials, including login credentials. The first database 240 may also store configuration information for customizing the web pages that are viewed by the user. Second database 250 stores user profile information. User profile information can include basic personal information, such as name, address, social security number, credit card information, e-mail address, and user account information. In general, first database 240 is, for example, an LDAP directory, which is less secure than second database 250 but provides speedier access than second database 250. Less sensitive information can be stored in first database 240, and more sensitive information can be stored in second database 250, which is typically slower but more secure.

The use of a central user directory server, such as RMI-implemented user directory server 230 and a central user data store, such as databases 240, 250, has several advantages. First, this approach allows greater flexibility than requiring individual applications to access the user directory directly using the LDAP protocol. Second, the user directory server ensures race conditions are minimized and/or eliminated for establishing unique login names for access to multiple applications accessible through the web site. Third, the user directory server abstracts the actual data storage technique allowing modifications and replacement of the data storage technique with no impact on the applications that use the data storage.

In an embodiment of the invention, user directory server 230 is implemented as a component within a customer profile and registration (CPR) application. Aside from user directory server 230, the customer profile and registration application also includes a policy server 220 and first and second databases 240 and 250 as additional components.

Figure 4:
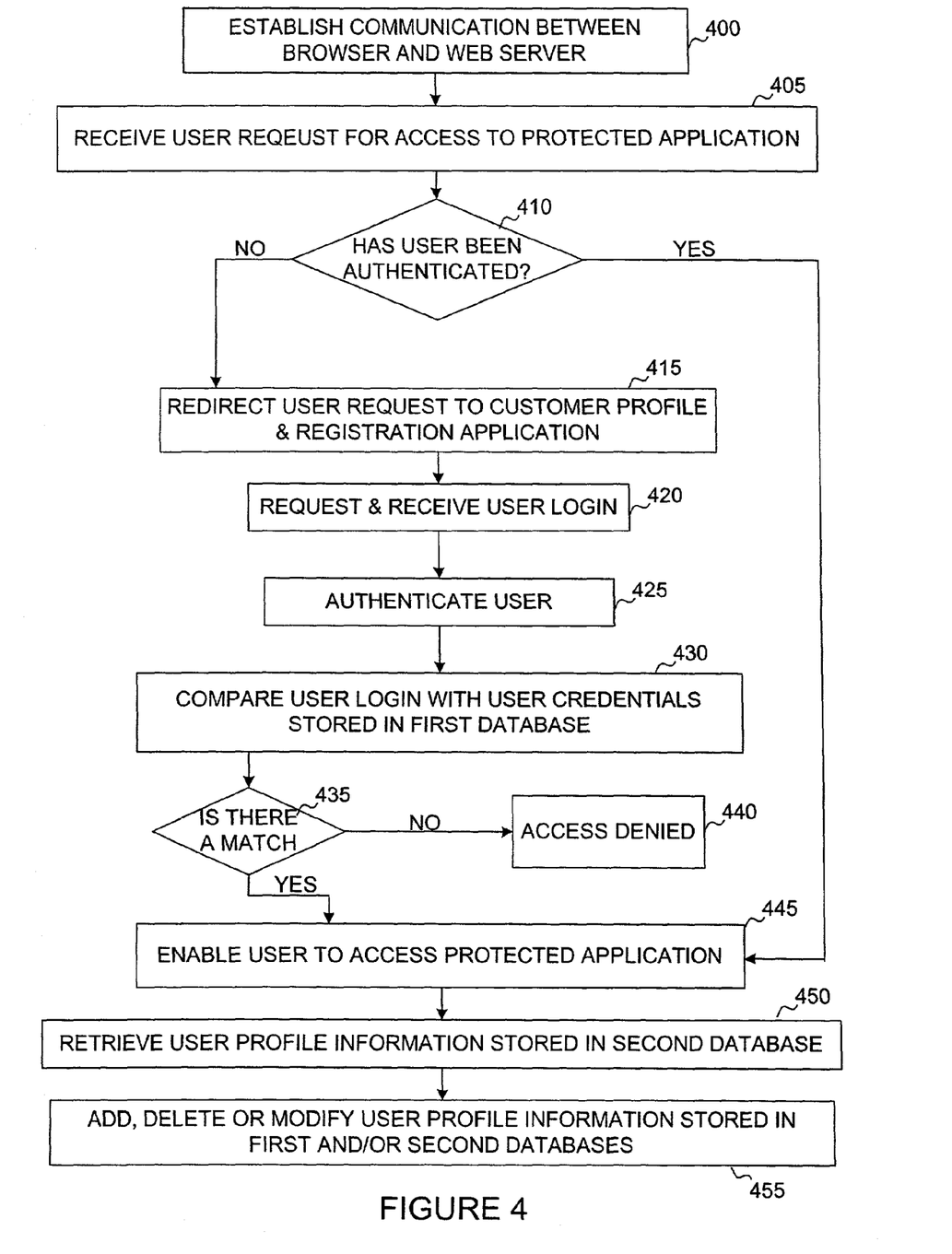
FIG. 4 is a flow chart illustrating an embodiment of a method in accordance with an embodiment of the present invention.

FIG. 4 is a flow chart illustrating a method in accordance with an embodiment of the present invention. In step 400, communication is established between a user's browser and a web server. Such communication can be established, for example, by a user logging onto the Internet by using the services of an internet service provider (ISP), and then using browser software to locate and link to an internet web site. Alternatively, such communication may be established within a closed network, for example, an intranet. In step 405, the web server receives the user's request for access to a protected application which may be accessed via the web server. The request may be communicated, for example, by entering the URL of the protected application or by clicking on a button or other type of link on the web site. In step 410, a determination is made whether the user has already been authenticated. If so, the user is granted access to the protected application in step 445. If not, in step 415, the user's request is redirected to a customer profile and registration (CPR) application operating within the web site. The CPR application requests and receives user login information in step 420. In step 425, the user is authenticated, for example, by comparing the user login information with user credentials stored in a first database in step 430. In step 435, it is determined whether there is a match. If not, access is denied in step 440. If so, the user is granted access to the protected application in step 445. In step 450, the application may retrieve user profile information that is stored in a second database. In step 455, operations carried out within the application may also add, delete or modify user credentials and/or user profile information that is stored in the first and second databases. Embodiments of the system and method of the invention are described in further detail below:

Referring again to FIG. 2 and in accordance with an embodiment of the invention, the CPR application preferably includes one or more web agents installed on web server 200 for protecting sensitive web pages and applications that can be accessed through the server. The web agents are, for example, SiteMinder™ web agents, available from Netegrity, Inc. of Waltham, Mass., which are installed as plug-ins in web server 200. The SiteMinder™ web agents interact with policy server 220, preferably a SiteMinder™ policy server, to provide authentication and authorization services for the web pages and applications that can be accessed through the web server.

When a user requests access to a web page or application, the SiteMinder™ web agent first determines whether or not the web page or application is protected by SiteMinder™. A user can request access, for example, by clicking on a button or specifying the URL of the web page or application. If the requested web page or application is not protected, the web server will process the request. If the requested web page or application is protected by a SiteMinder™ web agent, then a login page will be displayed to the user, and the user will be required to login, if she has not already done so.

When a user logs in, the user's credentials are presented to the SiteMinder™ web agent. The encrypted credentials are then passed to the SiteMinder™ policy server 220. Typically, the credentials include a user name and password, but they can also include a certificate, a token card, SMART card or PIN. Authentication is performed by the SiteMinder™ policy server 220 against the first database 240, which in a preferred embodiment is an LDAP directory containing user credentials for a plurality of users of the web site. Authentication involves comparing the user login information with a database of user login credentials to determine whether there is a match. For example, a user may be required to enter a user name and password. If the user name and password exist in the directory, then the user is authenticated.

If the user fails to authenticate, then an error message is displayed to the user. If the user successfully authenticates to the policy server, then an encrypted cookie is created and stored in the user's browser. This cookie can be used later to allow single sign-on across all of the web pages and applications on the web site.

The policy server 220 contains a set of policies for protecting sensitive resources, such as web pages and applications that can be accessed through web server 200. Each policy defines who can access each resource, the conditions under which access will be allowed, and user entitlement information that should be returned to the application upon successful authorization. Once a user has been authenticated, the policy server next finds all of the policies that relate to the resource that has been requested by the user. The policy server consults the first database 240, preferably an LDAP directory, to determine whether the user is a member of any of the groups associated with any of the relevant policies. Groups may be, for example, employees or customers, or organizational units, such as marketing or manufacturing. If the user is not authorized to access the requested resource, then an error message will be sent to the user. If the user is authorized to access the resource, then the user will be granted access.

Policy server 220 uses the first database 240, preferably an LDAP directory, to store configuration information. Alternatively configuration information could be stored in second database 250. Configuration information enables the web server and/or applications server to customize the web pages that are viewed by the user. For example, when a user accesses an application, web agents operating on the web server pass configuration information relating to the particular user, for example, in the form of header variables, from the first database 240 or second database 250 directly to the application. The configuration information may be used to personalize the content of the web page or application for the user. In this way, the application needs only simple code to generate user-customized web pages.

In addition to user authentication, further security measures may be implemented to protect sensitive customer information, such as account information. The CPR application may include a user profile service to obtain and validate customer account information. A user may be required to enter a PIN or customer code before the user's account information is associated with his login ID.

The applications running on applications server(s) 210 may include applications such as bill payment, receipt and processing of customer orders, a catalog, and/or customer account application. The bill payment application can be, for example, Microsoft Corporation and First Data Corporation's Electronic Bill Presentment and Payment (EBPP) application. These applications are typically J2EE applications, such as Java™ servlets, Java™ server pages, and/or Enterprise Java™ Beans (EJB), which are implemented on server 210, which may be, for example, an iPlanet™ Application Server, available from Sun Microsystems, a WebSphere™ Application Server from IBM, or a web server from Web Launching. One or more of these applications may require user profile information, such as a user's address, telephone number or credit card information, in order to process a user request. Such user profile information is stored in a second database 250. Applications use CPR shared beans, which represent CPR EJB beans, to obtain user profile information from second database 250. User profile information can be downloaded from second database 250 to other databases for generating reports regarding use of the various applications and to populate various customer profile data fields.

In accordance with an embodiment of the invention, user directory server 230 uses a Java™ interface to manage user information in first and second databases 240, 250. In particular, user directory server 230 allows client programs to add, delete, modify, check the existence of, and retrieve data entries in the first database 240 and second database 250. The user directory server can store different categories of users in different locations within a database such as, for example, an LDAP directory. For example, a categoryID may be assigned to different classes of users, such as customers and employees, so that they can be stored in different branches of the directory. A user can be added to or deleted or retrieved from the directory by providing the categoryID and user login name. An entry can be modified by supplying the categoryID, user login name, and a hashtable containing the attribute values to be updated. A user's password can be modified by supplying the categoryID, login name and the new password for the user.

In a preferred embodiment, the user directory server 230 includes a number of object classes, such as DirectoryDAO (Directory Data Access Objects), DirectoryDAOCache, DirectoryUserValue, IUserDirectoryService, UserCategory, and UserDirectoryService.

The DirectoryDAO object class is responsible for adding, deleting, updating and retrieving directory entries from the first database (preferably an LDAP directory). This class uses the Java™ Naming and Directory Interface (JNDI) to interact with the directory. This class is designed to manipulate user directory entries stored as a particular predetermined object class. The class is not written generically to operate on any object class. The class does allow different categories of users to be stored in different locations of a directory tree. This functionality is implemented with the assistance of the UserCategory class. An instance of the UserCategory class maintains attributes for a specific user category including the location where directory entries for this user category will be stored and the search scope over which the login names for users of this category are unique. The UserCategory class also provides helper methods for manipulating directory attributes for a specific user category.

The DirectoryDAOCache object class maintains a cache of directory data access objects (DirectoryDAO). This class does not limit the number of DirectoryDAO objects that can be active at one time. It does maintain a cache of currently inactive objects and will reuse these objects when a request is received for a DirectoryDAO object. The size of the cache is configurable. If the cache is full and another DirectoryDAO object is released to cache, then the object just released will be discarded.

The DirectoryUserValue object class encapsulates the directory attributes for web users and administrators. This class is used to communicate directory information between the client application and the User Directory Server.

The IUserDirectoryService object class defines the interface for the user directory server 230, which allows client programs to add, delete, modify, check the existence of and retrieve entries in the directory. The user directory server can store different categories of users in different location within the directory. For example, customers may be stored in one branch of the directory and employees or administrators may be stored in another branch. The storage context (where an entry will be stored) and the search context (the scope over which a user's login name is unique) must be supplied in the user directory server's XML configuration file for each unique user category.

The UserCategory object class defines a directory user category and is related information. Each user category has a category name, a storage context, and a search context. The storage context defines where entries will be stored in the directory. The search context defines the directory scope over which user IDs are unique. This class also implements a number of helper methods for building user distinguished names, creating directory attributes from a DirectoryUserValue object and creating a DirectoryUserValue object from a directory entry's attributes.

The UserDirectoryService class implements the User Directory Server interface. The user directory server allows client programs to add, delete, modify, check the existence of, and retrieve entries in the directory.

In accordance with an embodiment of the invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of systems and methods for managing web user information have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive.

What is claimed is:

1. A system for managing information concerning users of a network web site, the system comprising:
 a web server for providing access to various network resources, including web pages and applications;
 an applications server coupled to the web server for running two or more protected applications, to which access is restricted to authorized users;
 a customer profile and registration application operating in conjunction with the web server and applications server for receiving user login information and authenticating users, wherein said customer profile and registration provides single sign-on capability, such that a user can access two or more restricted applications via a single login;
 a user directory server for centrally managing information concerning users, said user directory server being coupled to (i) a first database for storing user credentials for a plurality of users, and (ii) a second database for storing user profile information for a plurality of users, wherein said user profile information and said user credentials can be added, modified, deleted or retrieved by operations carried out within at least one of said applications, the user directory server storing a categoryID for at least one user, such that different categories of users are stored in different locations of a directory, with each category having a name, a storage context, and a search context, the storage context defining where entries are stored in the directory, and the search context defining a directory scope over which user IDs are unique, the user directory server maintaining a cache of inactive directory objects, and when a request is received for a directory object, the user directory server accesses the cache and reuses the directory objects, and when the cache is full and a directory object is released to the cache, the directory object is discarded; and
 a functional server returning an instance of the user directory server, the functional server maintaining a pool of user directory server instances and allocating instances from the pool in a round robin fashion.

2. The system of claim 1, wherein said customer profile and registration application utilizes a policy server for determining what classes of users have access rights to which network resources.

3. The system of claim 1, wherein at least one of said first database and said second database stores customization information for enabling the web server or applications server to customize the web pages that are viewed by a user.

4. The system of claim 1, wherein said user profile information comprises personal information about the user.

5. The system of claim 1, wherein said user profile information comprises user account information.

6. The system of claim 1, wherein said user profile information comprises information concerning what web pages and applications the user has viewed or used in the past.

7. The system of claim 1, wherein said user directory server is implemented on a Remote Method invocation server.

8. The system of claim 1, wherein said first database operates in accordance with the Lightweight Directory Access Protocol.

9. The system of claim 1, wherein the applications running on the applications server include one or more of a bill payment application, an application for receiving and processing customer orders, a catalog application, and a customer account application.

10. A method for managing information concerning users of a web site, the method comprising:
 establishing a communications link between a network web site and a user computer, the network web site comprising: (i) a web server for providing access to various network resources, including web pages and applications; (ii) an applications server coupled to the web server for running two or more protected applications, to which access is restricted to authorized users; and (iii) a user directory server for centrally managing information concerning users, the user directory server storing a categoryID for at least one user, such that different categories of users are stored in different locations of a directory, with each category having a name, a storage context, and a search context, the storage context defining where entries are stored in the directory, and the search context defining a directory scope over which user IDs are unique, the user directory server maintaining a cache of inactive directory objects, and when a request is received for a directory object, the user directory server accesses the cache and reuses the directory objects, and when the cache is full and a directory object is released to the cache, the directory object is discarded, and (iv) a functional server returning an instance of the user directory server, the functional server maintaining a pool of user directory server instances and allocating instances from the pool in a round robin fashion;

storing user credentials for a plurality of users in a first database coupled to the user directory server;

storing user profile information for a plurality of users in a second database coupled to the user directory server;

receiving a user request for access to a protected application;

receiving user login information and authenticating a user by comparing the user login information with user credentials stored in the first database;

enabling an authenticated user to access two or more protected applications without requiring further authentication;

retrieving user profile information from the second database for use in connection with operations carried out by the authenticated user within one or more applications.

11. The method of claim 10, further comprising customizing a web page that is viewed by the user by retrieving and utilizing customization information that is stored in at least one of said first database and said second database.

12. The method of claim 11, wherein receiving user login information and authenticating the user is carried out by a customer profile and registration application which utilizes a policy server for determining what classes of users have access rights to which network resources.

13. The method of claim 10, wherein said user profile information comprises one or more of: (i) personal information about the user; (ii) user account information; and (iii) information concerning what web pages and applications the user has viewed or used in the past.

14. The method of claim 10, further comprising one or more of adding, deleting, modifying, or retrieving said user credentials or user profile information by an operation carried out within at least one of said applications.

15. The method of claim 10, wherein said user directory server is implemented on a Remote Method Invocation server.

16. The method of claim 10, wherein said first database operates in accordance with the Lightweight Directory Access Protocol.

17. The method of claim 10, wherein the applications running on the applications server include one or more of a bill payment application, an application for receiving and processing customer orders, a catalog application, and a customer account application.

18. A system for managing information concerning users of a network web site, the network web site comprising a web server for providing access to various network resources, including web pages and applications, and an applications server coupled to the web server for running two or more protected applications, the system comprising:

a first database storing user credentials for a plurality of users;

a second database storing user profile information for a plurality of users, wherein said user profile information and said user credentials may be added, modified, deleted or retrieved by operations carried out within at least one of said applications, the second database storing a categoryID for at least one of the plurality of users, such that different categories of users are stored in different locations of a directory, with each category having a name, a storage context, and a search context, the storage context defining where entries are stored in the directory, and the search context defining a directory scope over which user IDs are unique, the second database maintaining a cache of inactive directory objects, and when a request is received for a directory object, the second database accessing the cache and reusing the directory objects, and when the cache is full and a directory object is released to the cache, the directory object is discarded;

means for receiving user login information and authenticating a user by comparing the user login information with user credentials stored in said first database;

means for enabling an authenticated user to access two or more protected applications without requiring further authentication; and means for retrieving user profile information stored in said second database and utilizing said user profile information in connection with operations carried out by a user within an application.

19. The system of claim 18, further comprising means for customizing a web page that is viewed by the user by retrieving and utilizing customization information that is stored in at least one of said first database and said second database.

20. A computer-readable medium storing a plurality of instructions to be executed by a processor for managing information concerning users of a network web site which comprises a web server for providing access to various network resources, including web pages and applications, and an applications server coupled to the web server for running two or more protected applications, the plurality of instructions comprising instructions to:

store user credentials for a plurality of users in a first database coupled to a user directory server, the user directory server storing a categoryID for at least one of the plurality of users, such that different categories of users are stored in different locations of a directory, with each category having a name, a storage context, and a search context, the storage context defining where entries are stored in the directory, and the search context defining a directory scope over which user IDs are unique, the user directory server maintaining a cache of inactive directory objects, and when a request is received for a directory object, the user directory server accesses the cache and reuses the directory objects, and when the cache is full and a directory object is released to the cache, the directory object is discarded;

store user profile information for a plurality of users in a second database coupled to the user directory server;

receive user login information and authenticate a user by comparing the user login information with user credentials stored in said first database;

enable an authenticated user to access two or more protected applications without requiring further authentication; and add, modify, delete and retrieve said user credentials and user profile information pursuant in response to operations carried out within at least one of said applications.

* * * * *

UNITED STATES PATENT AND TRADEMARK OFFICE
CERTIFICATE OF CORRECTION

PATENT NO.       : 7,225,462 B2
APPLICATION NO.  : 10/179280
DATED            : May 29, 2007
INVENTOR(S)      : Bass et al.

It is certified that error appears in the above-identified patent and that said Letters Patent is hereby corrected as shown below:

On the title page item [75] delete Mark Kirpatrick as an inventor, and the proper spelling should be inserted Mark Kirkpatrick.

Signed and Sealed this

Thirty-first Day of July, 2007

JON W. DUDAS
*Director of the United States Patent and Trademark Office*